April 30, 1968     R. D. LOUCKS ET AL     3,381,202
DC VOLTAGE MAGNITUDE MODIFYING ARRANGEMENT
Filed Feb. 2, 1967                                        2 Sheets-Sheet 1
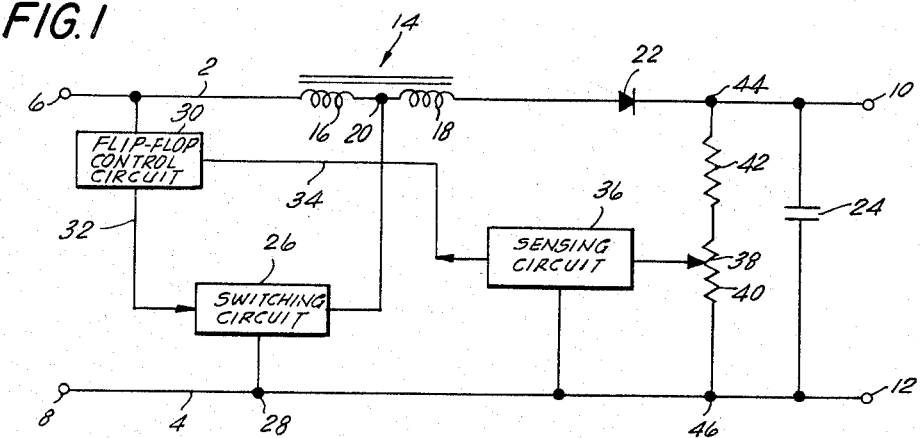
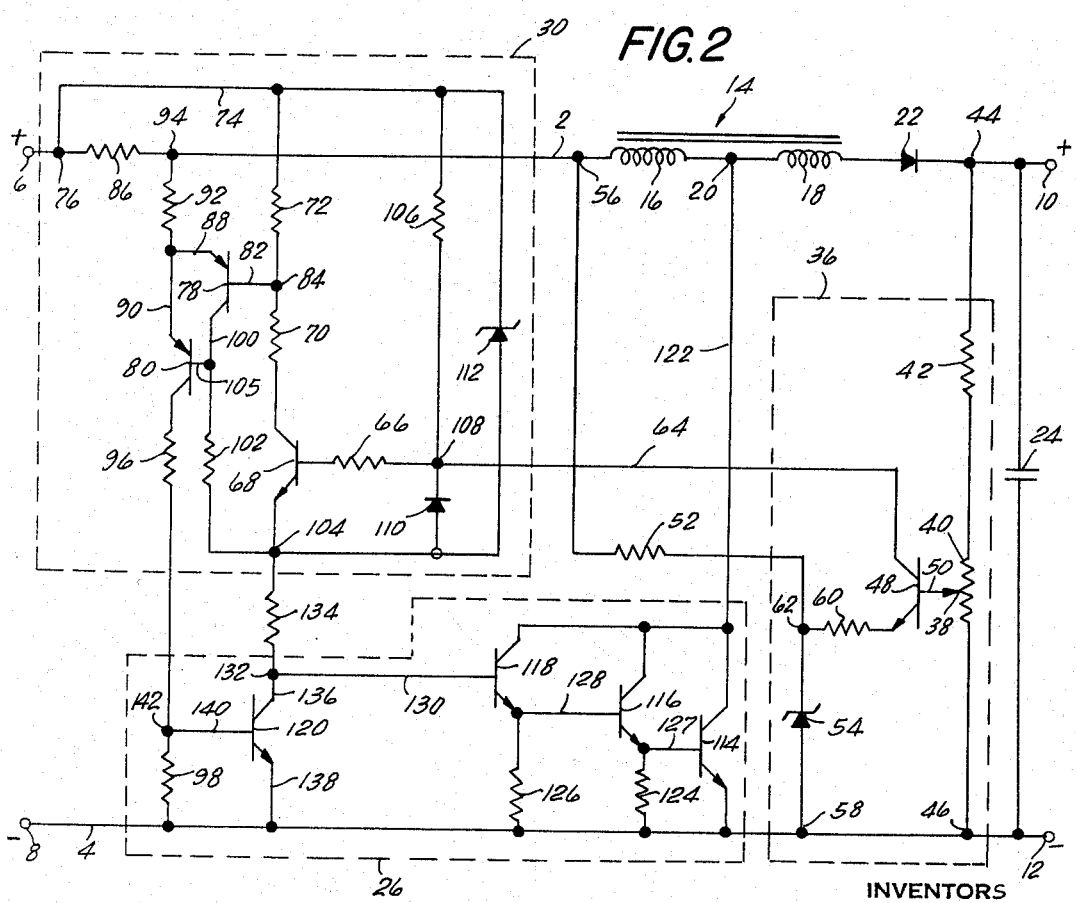
INVENTORS
RUSSELL D. LOUCKS
PETER J. LUPOLI
BY
*James and Franklin*
ATTORNEY April 30, 1968   R. D. LOUCKS ET AL   3,381,202
DC VOLTAGE MAGNITUDE MODIFYING ARRANGEMENT
Filed Feb. 2, 1967   2 Sheets-Sheet 2

INVENTORS
RUSSELL D. LOUCKS
PETER J. LUPOZI
BY
*James and Franklin*
ATTORNEY

United States Patent Office 3,381,202
Patented Apr. 30, 1968

3,381,202
DC VOLTAGE MAGNITUDE MODIFYING
ARRANGEMENT
Russell D. Loucks, New Rochelle, N.Y., and Peter J.
Lupoli, Hamden, Conn., assignors to Technipower Incorporated, South Norwalk, Conn., a corporation of Connecticut
Continuation-in-part of application Ser. No. 435,851, Mar. 1, 1965. This application Feb. 2, 1967, Ser. No. 622,861
10 Claims. (Cl. 321—2)

ABSTRACT OF THE DISCLOSURE

A magnitude modifying DC voltage power supply utilizing a switching transistor to control the output voltage, that transistor being so connected as to have applied thereacross a voltage less than the output voltage.

This application is a continuation-in-part of our copending application Ser. No. 435,851, filed March 1, 1965, entitled "DC Voltage Step-up Arrangement," and being assigned to the same assignee.

The present invention relates to a circuit arrangement for producing a magnitude-modified DC voltage with a high degree of efficiency and reliability.

There are many applications where a DC voltage supply is available but where it is desirable that a voltage be used which is higher than that which the DC source is capable of providing. It has been proposed to produce this stepped-up or increased output voltage by causing a current to intermittently build up and decay through an inductance and utilizing the increased voltage attendant upon such action to charge an output capacitor. The voltage-producing intermittent current through the inductance is controlled by switching means connected across the line between the inductance and the output capacitor, and the timing of this switching means, and in particular the time relationship between its "on" and "off" conditions, is varied in accordance with the voltage to which the output capacitor is charged, thereby to maintain that voltage at a proper value. The desirability of using an electronic switching means (one with no physically movable parts) is obvious, and transistors are preferred in this connection, in part because of their high efficiency.

However, transistors are quite sensitive to the voltage to which they are subjected. Hence the fact that the transistors employed for switching purposes were subjected to the total stepped-up output voltage was a definite drawback, particularly from the point of view of reliability.

The switching transistor must be turned on and off very rapidly, and the precise relationship between on-time and off-time must be very precisely controlled if the stepped-up output voltage is to be maintained at a constant value. Electronic, and particularly solid state electronic, devices are desirable for controlling the switching transistor, but the arrangements which have been proposed in the past for controlling the switching transistor have been quite complex and expensive, involving, for example, the use of silicon controlled rectifiers and a separate saturable-core winding electromagnetically associated with the voltage-increasing inductance to provide the signals necessary to cause the silicon controlled rectifier to function properly. The use of such a separate winding required that each unit be tailor-made for a particular application, and because those windings operated on a saturation principle the units were sensitive to variations or ripple in the input voltage.

The prime object of the present invention is to overcome these disadvantages of the prior art circuitry. In particular, the circuitry of the present invention utilizes a transistor for switching purposes but subjects that transistor to only a fraction of the total output voltage, thus greatly increasing the reliability and life of its operation. In addition, an all-transistor control circuit is provided for the switching transistor, thus eliminating the need for silicon controlled rectifiers, and in an illustrated embodiment also eliminating the additional windings required in connection with the use of such rectifiers. As a result a circuit is produced which is capable of providing increased output voltages, when compared with the prior art, with a high degree of efficiency, with an increased degree of reliability, and at a lower cost. Moreover, the resultant apparatus is more adaptable to different circuit applications, so that a single standard unit of wide utility can be engineered and produced. Such units can be smaller and lighter than prior art apparatus for the same purpose.

These results are accomplished by utilizing, for the voltage-increasing inductance, a pair of inductively related winding sections, with the switching transistor being connected to the line, which contains at least one of the inductance sections, at a point between those two sections. Thus the switching transistor is subjected only to the maximum voltage produced by one of those winding sections, whereas the output voltage is at a higher value, produced in one illustrated embodiment by the two winding sections acting in aiding relationship and in the other illustrated embodiment by the second section alone. The switching transistor is actuated between its on and off conditions by means of a transistorized flip-flop circuit which shifts back and forth from one operational status to the other, the existence of each status of the flip-flop circuit respectively actuating the switching transistor to either its on-condition or its off-condition. The percentage of time that the flip-flop circuit is in one status or another, and hence the percentage of time that the switching transistor is on or off, is controlled in accordance with the output voltage by means of a transistorized voltage sensing circuit which is in turn operatively connected to the flip-flop circuit. The system of the present invention may be inherently self-starting, and no special circuit elements need be provided for that purpose.

Where the output winding section is not connected directly in series with the input winding section, as is the case in the second and third embodiments here specifically illustrated, either a step-up or a step-down characteristic can be obtained, and the voltage output can be made to fall to zero when the switching transistor remains open or non-conductive, thus preventing overloading in the case of a short in the load circuit. In that type of arrangement it is preferred to sense the output voltage and control the switching transistor in accordance therewith. When this is done, additional windings may be provided from which additional voltage outputs can be derived, and the regulation effected by directly sensing one output voltage will accurately provide regulation for values for all of the other outputs.

To the accomplishment of the above, and to such other objects as may hereinafter appear, the present invention relates to the circuit arrangement for a voltage step-up device as defined in the appended claims and as described in this specification, taken together with the accompanying drawings, in which:

FIG. 1 is a simplified circuit diagram of a preferred embodiment of the system of the present invention, shown partially in block form;

FIG. 2 is a complete circuit diagram of one preferred embodiment of the present invention;

Figure 4:
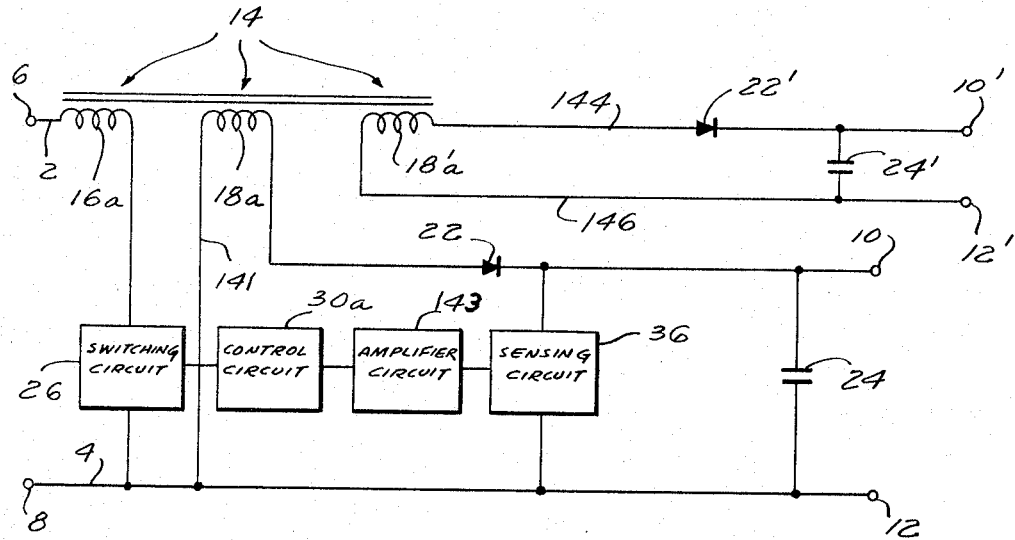
FIG. 4 is a similar circuit diagram of yet another preferred embodiment.

In the embodiment of FIGS. 1 and 2, the voltage step-up arrangement comprises a pair of lines 2 and 4 connecting input points 6 and 8 with output points 10 and 12 respectively. Any suitable DC voltage scource is adapted to be connected across the input points 6 and 8. That source may, for example, be a fuel cell which produces a voltage of approximately one volt or it may be an AC source feeding through a rectifier. In one of the lines, here shown as the line 2, an inductance generally designated 14 is connected. In accordance with the present invention, and as embodied in this particular embodiment, the inductance 14 comprises a pair of serially connected and inductively associated winding sections 16 and 18, the reference numeral 20 representing a point on the line 2 between the winding sections 16 and 18. The inductance 14 may take the form of a dual-wound or center-tapped choke coil. In series with the inductance 14, and on the output side thereof, is a rectifier 22 poled to permit ready current flow from input to output. A capacitor 24 is connected between the lines 2 and 4 on the output side of the rectifier 22.

A switching circuit 26 is connected between the points 20 and 28 on the lines 2 and 4 respectively. A flip-flop control circuit 30 is operatively connected to the switching circuit 26, as indicated by the line 32. The flip-flop circuit 30, as the name implies, will periodically shift from one status to another, and it will control the switching circuit 26 accordingly. When the flip-flop circuit 30 is in one status it will cause the switching circuit 26 to be in its "on" condition constituting a closed circuit between the points 20 and 28. When the flip-flop circuit 30 is in its other status it will cause the switching circuit 26 to assume its "off" condition, constituting an open circuit between the points 20 and 28. The timing of the shifting of the flip-flop circuit 30 from one status to the other is controlled, as indicated by the line 34, by a sensing circuit 36 which is connected to an adjustable point 38 on the resistor 40, which, in series with the resistor 42, is connected across the lines 2 and 4 between points 44 and 46. The resistors 40 and 42, it will be noted, are connected at the output side of the rectifier 22, so that voltage at the point 38 will represent a predetermined proportion of the output voltage across the output points 10 and 12. Adjustment of the position of the point 38 along the resistor 40 will permit control of that output voltage.

The circuit, broadly considered, functions as follows: When the switching circuit 26 goes from off to on a current will flow therethrough from the input voltage source connected across the input points 6 and 8 and through the winding section 16 of the inductance 14. Because of the inductance thereof that current will slowly build up. When the switching circuit 26 then goes from on to off, the stored energy in the winding section 16 will tend to maintain the current flowing therethrough, which current will slowly decay. As this occurs the magnetic field associated with the winding section 16 will collapse, thus inducing a voltage in the winding section 16 which adds to the voltage derived from the input source connected across the points 6 and 8. This increase in voltage, and the current accompanying it, cannot pass through the switching circuit 26 because the switch is open, so it passes through the rectifier 22 and charges the output capacitor 24. The rectifier 22 prevents reverse flow from the output capacitor 24. For so long as the switching circuit 26 continues its shift between on and off conditions, impulses of additional current will be supplied to the output capacitor 24, and by controlling the time of switching of the switching circuit 26, and more particularly the relation between the time that the switch is closed and the time that the switch is open, the output capacitor 24 can be kept charged to a desired value, that constituting the output voltage across the output points 10 and 12.

As thus far described only the action of the winding section 16 has been considered. Because of the relationship between the winding sections 16 and 18, the flow of current through the winding section 18 when the switching circuit 26 is open or off will cause an additional voltage to be generated in that winding section 18 which, if the winding section 18 is wound in an appropriate direction, will add to the voltage increment generated by the winding section 16. However, since the switching circuit 26 is connected to the point 20 located in advance of the winding section 18, the switching circuit 26 itself will not be subjected to the voltage increment produced by the winding section 18, but will only be subjected to the voltage increment produced by the winding section 16. Hence the circuit elements comprising the switching circuit 26 will be subjected to a voltage greater than the input voltage applied across the input points 6 and 8 but less than the total output voltage applied across the output points 10 and 12. As has been pointed out, this gives rise to a marked increase in reliability of operation.

Turning now to FIG. 2, which represents a circuit diagram of a preferred embodiment of the present invention, the sensing circuit 36, flip-flop control circuit 30 and switching circuit 26 are enclosed within broken line boxes to which the appropriate reference numerals have been applied. The sensing circuit 36 comprises a transistor 38 the base of which is connected, by lead 50, to the point 38 on resistor 40. A resistor 52 and a Zener diode 54 are connected in series between points 56 and 58 on the lines 2 and 4 respectively, and the emitter of transistor 48 is connected, via resistor 60, to point 62 located between the resistor 52 and the Zener diode 54. The collector of the transistor 48 is connected by lead 64 and resistor 66 to the base of transistor 68 forming a part of the control circuit 30. The collector of transistor 68 is connected by resistors 70 and 72 to lead 74, which is in turn connected, at point 76, to the input point 6 and line 2. The flip-flop portion of the control circuit 30 is defined by transistors 78 and 80. The base of transistor 78 is connected by lead 82 to point 84 between the resistors 70 and 72. A resistor 86 is connected in the line 2, and the emitters of transistors 78 and 80 are connected, via leads 88 and 90 respectively and resistor 92, to point 94 at the output end of the resistor 86. The collector of transistor 80 is connected via resistors 96 and 98 to line 4. The collector of transistor 78 is connected by lead 100 and resistor 102 to point 104, and the base of transistor 80 is connected by lead 105 and lead 100 to the emitter of transistor 78. A resistor 106 is connected between line 74 and point 108 on lead 64, and a rectifier 110 is connected between points 104 and 108 and poled toward point 108. A Zener diode 112 is connected between point 104 and lead 74.

The switching circuit 26 comprises transistors 114, 116, 118 and 120. Transistors 114, 116 and 118 have their emitter-collector circuits connected in parallel between line 4 and line 2, via lead 122. Resistors 124 and 126 are connected between line 4 and the emitters of transistors 116 and 118 respectively. The base of transistor 114 is connected by lead 127 to the emitter of transistor 116, and the base of transistor 116 is connected by lead 128 to the emitter of transistor 118. The base of transistor 118 is connected by lead 130 to point 132. The point 132 is connected by resistor 134 to point 104, and is connected by lead 136 to the collector of transistor 120, the emitter of that transistor being connected by lead 138 to the line 4. The base of transistor 120 is connected by lead 140 to point 142 located between the resistors 96 and 98.

The operation of the circuit is as follows: a bias is applied to the base of transistor 48 in accordance with the output voltage across output points 10 and 12. A bias is applied to the emitter of transistor 48 as determined by the voltage reference Zener diode 54. Hence the transistor 48 compares a predetermined fraction of the output voltage with the reference voltage and its emitter-collector current is controlled in accordance therewith, that current flowing through the resistor 106. The amount of current flowing through the resistor 106 determines the bias on the base of transistor 68, thereby controlling the amount of emitter-collector current for that transistor, said emitter-collector current flowing through the resistors 70 and 72. The amount of current flowing through the resistor 72 controls the bias on the base of transistor 78.

The transistors 78 and 80 constitute a flip-flop circuit whose action is controlled by the bias on the base of transistor 78 and by the voltage drop across the resistor 86 due to current flow into the inductance 14. In one status of the flip-flop circuit emitter-collector current will flow only through the transistor 78; in the other status of that flip-flop circuit emitter-collector current will flow only through the transistor 80. When emitter-collector current flows only through the transistor 80 the transistor 120 will be saturated and will thus by-pass to line 4 the base current for transistor 118. Hence transistor 118 will be rendered non-conductive, and transistors 114 and 116 will be rendered non-conductive, the switching circuit 26 thus being placed in "off" or open circuit condition. When emitter-collector current flows through transistor 78, transistor 120 will be non-conductive, base current will be provided to transistor 118, and it and transistors 114 and 116 will be rendered conductive with regard to their emitter-collector circuits, thus placing the switching circuit 26 in its "on" or closed circuit condition. The flip-flop transistors 78 and 80 are so connected that first one and then the other will be rendered conductive as determined by the voltage output across the points 10 and 12 and the voltage drop produced in resistor 86 by the current flowing through the inductance 14. With the transistor 78 conductive, and hence with the switching transistors 114-118 on, a current will flow through the resistor 86 and the inductance winding section 16. The magnitude of that current will build up in accordance with the inductance characteristic of the winding section 16. The conductivity status of transistor 78 will be controlled by the bias applied to its base (that in turn controlled by the output voltage through the transistor 48) and the voltage drop produced in resistor 86 by the flow of said current. When that current reaches a predetermined magnitude the bias on the emitter of transistor 78 will be changed sufficiently to turn that transistor off and to turn the transistor 80 on by changing the bias on its base (the circuit will "flop"), this being effective to turn the switching transistors 114-118 off. The cessation of the collector-emitter current of the transistor 78 will return the base of transistor 80 to the original bias which existed before the transistor 78 became conductive. As the current through the resistor 86 and the winding section 16 diminishes, the bias on the emitters of the transistors 78 and 80 will change, and the point in time at which the transistor 78 will again become conductive (the circuit will "flip") will be determined by the bias on the base of transistor 78 which is, as we have seen, controlled by the output voltage.

It will be appreciated from the above that the circuitry of the present invention includes all of the advantages of utilizing transistors to effectuate the necessary switching, without having to subject those switching transistors 114-118 to the full output voltage, and further that the control of the switching action is effected by an all-transistor circuit which requires no special windings or cores for control purposes, and which is therefore appreciably less expensive than prior art constructions.

A very significant advantage of the circuitry of the present invention, apart from those already set forth, is the flexibility of use of the circuitry involved. Where separate windings are required, as when silicon controlled rectifiers are employed, a given winding can be used only with a very limited number of applications. If the circuit requirements vary to any appreciable degree, separate windings must be designed and used. This limitation is not applicable to the instant circuitry, a standard embodiment of which can be used without change in connection with a very wide variety of different circuit applications. Moreover, silicon controlled rectifier control involves winding core saturation. This requires the use of a filtered DC input, since ripple in that input might affect the saturation of the core and hence the switching control of the silicon controlled rectifier. With the circuitry of the present invention, by way of contrast, an unfiltered input can be used, since ripple has no appreciable effect on the operation of the instant circuit.

Figure 3:
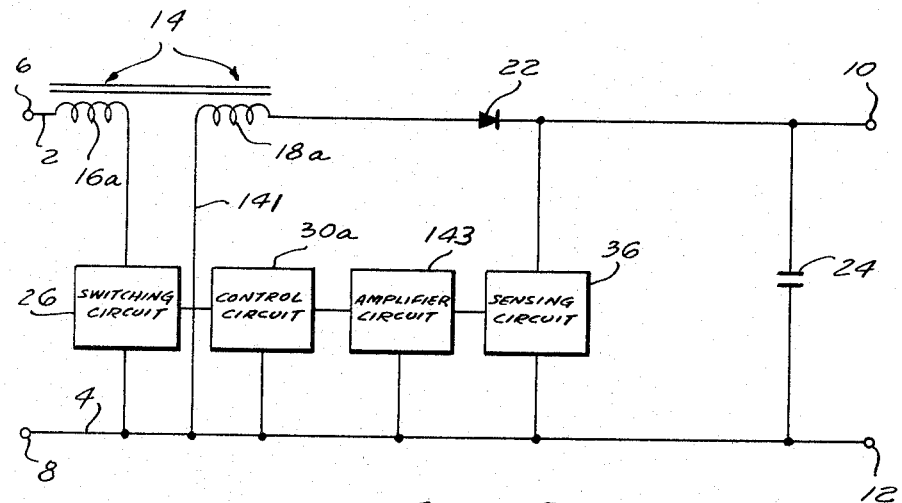
FIG. 3 is a simplified circuit diagram of another preferred embodiment of the present invention, shown partially in block form.

Purely by way of exemplification, circuit components having the following values may be used:

Inductance 14—4 millihenries, center-tapped
Capacitor 24—6000 mfd.
Resistor 40—1K ohms
Resistor 42—1K ohms
Transistor 48—2N3053
Resistor 52—3300 ohms for 28 volts DC input
Zener Diode 54—1N751
Resistor 60—1K ohms
Resistor 66—1K ohms
Transistor 68—2N3053
Resistor 70—1K ohms
Resistor 72—470 ohms
Transistor 78—2N3250
Transistor 80 —2N3250
Resistor 86—.05 ohm
Resistor 92—100 ohms
Resistor 96—4.7K ohms
Resistor 98—1K ohms
Resistor 102—1K ohms
Resistor 106—2.2K ohms
Zener Diode 112—1N751
Transistor 114—2N3442
Transistor 116—2N 3441
Transistor 118—2N3053
Transistor 120—2N3053
Resistor 124—10 ohms
Resistor 126—4.7 ohms
Resistor 134—1K ohms In the embodiment of FIGS. 1 and 2 the winding sections 16 and 18 were conductively connected in series in the line 2 between input point 6 and output point 10. In the embodiment of FIG. 3 this is not the case. The inductance section 16a is connected between lines 2 and 4 in series with the switching circuit 26. The inductance section 18a, inductively associated with the section 16a, has one end connected by lead 141 to line 4, the other end thereof being connected via rectifier 22 to output point 10. Condenser 24 is connected between the line 4 and the output end of the rectifier 22. A sensing circuit 36 is connected across output points 10 and 12 so as to sense the output voltage and, through an amplifier circuit 143 and a control circuit 30a, controls the time sequence of the switching circuit 26 in a manner comparable to that involved in the embodiment of FIGS. 1 and 2. The arrangement of FIG. 3 functions in substantially the same fashion as that of FIGS. 1 and 2 except that the output voltage is developed exclusively from the inductance section 18a, the appropriate voltages being induced in that section by the flow and interruption of current in the inductance section 16a as produced by switching circuit 26. The arrangement of FIG. 3 has the advantage that it can be used either for voltage step-up or step-down, depending upon the turns ratio between the inductance sections 16a and 16b respectively. Moreover, because the output inductance section 18a is isolated from the input inductance section 16a, the output voltage across the output points 10 and 12 falls to zero when the switching circuit 26 is retained in open-circuit condition (in the embodiment of FIGS. 1 and 2 the output voltage would, under those circumstances, equal the input voltage). Hence in the embodiment of FIG. 3 if there should be a short circuit in the circuit to which the output points 10 and 12 are connected, the rise in output current can be sensed (by well-known means), and used to cause the switching circuit 26 to turn off, and hence the output voltage would fall to zero, preventing an overload condition.

The embodiment of FIG. 4 is similar to that of FIG. 3, and corresponding reference numerals are applied to corresponding parts. In addition, the inductance 14 is provided with a third winding section 18a', which is connected by lines 144 and 146 to output points 10' and 12' respectively, a rectifier 22' being connected in line 144 and a capacitor 24' being connected across the output points 10' and 12'. In this way a given system can have two different output voltages, across the points 10, 12 and 10', 12' respectively, the magnitude of those voltage outputs being determined by the number of turns in the inductance winding sections 18a and 18a' respectively. Since the control of the switching circuit 26 is effected by sensing one of the output voltages (that across the output points 10 and 12), the resulting voltage regulation will be effective on the other output voltage across the points 10' and 12'. It will be understood that more than one extra inductance section 18a', together with its associated rectifier 22' and condenser 24', could be employed to produce as many different and isolated output voltages as desired, with all of those output voltages being effectively regulated to take into account variations in input voltage.

While but a limited number of embodiments of the present invention have been here disclosed, it will be apparent that many variations may be made therein, all within the scope of the invention, as defined in the following claims.

We claim:

1. A DC voltage magnitude modifying arrangement comprising a DC input, a DC output, and a circuit operatively connecting said input and output, said circuit comprising inductance means and a rectifier operatively connected between said input and output, said inductance means comprising first and second inductively related sections, at least said second section being conductively connected to said output via said rectifier, at least said first section being conductively connected to said input, a capacitor connected across said output on the output side of said rectifier, switch means comprising electronic valve means actuatable to on and off conditions respectively, said switch means being conductively connected to said first section of said inductance means in a manner independent of said second section of said inductance means, and switch actuating means for sensing the voltage at said output and actuating said switch means between said on and off conditions in a manner related to said sensed output voltage, in which said first and second sections of said inductance means are conductively connected in series between said input and said output, and in which said switch actuating means comprises a flip-flop circuit, an output voltage sensing circuit, means operatively connecting said flip-flop circuit to said output voltage sensing circuit so that the timing of the flip-flop action of said flip-flop circuit is controlled by said sensing circuit, and an operative connection between said flip-flop circuit and said switch means, whereby the condition of said switch means is controlled by the status of said flip-flop circuit.

2. A DC voltage magnitude modifying arrangement comprising a DC input, a DC output, and a circuit operatively connecting said input and output, said circuit comprising inductance means and a rectifier operatively connected between said input and output, said inductance means comprising first and second inductively related sections, at least said second section being conductively connected to said output via said rectifier, at least said first section being conductively connected to said input, a capacitor connected across said output on the output side of said rectifier, switch means comprising electronic valve means actuatable to on and off conditions respectively, said switch means being conductively connected to said first section of said inductance means in a manner independent of said second section of said inductance means, and switch actuating means for sensing the voltage at said output and actuating said switch means between said on and off conditions in a manner related to said sensed output voltage, in which said first and second sections of said inductance means are conductively connected in series between said input and said output, and in which said switch actuating means comprises a flip-flop circuit, an output voltage sensing circuit, means operatively connecting said flip-flop circuit to said output voltage sensing circuit so that the timing of the flip-flop action of said flip-flop circuit is controlled by said sensing circuit, and an operative connection between said flip-flop circuit and said switch means, whereby the condition of said switch means is controlled by the status of said flip-flop circuit, and in which said voltage sensing circuit comprises a transistor having an output circuit and an input circuit, said input circuit being operatively connected to said output voltage, said output circuit being operatively connected to said flip-flop circuit.

3. A DC voltage magnitude modifying arrangement comprising a DC input, a DC output, and a circuit operatively connecting said input and output, said circuit comprising inductance means and a rectifier operatively connected between said input and output, said inductance means comprising first and second inductively related sections, at least said second section being conductively connected to said output via said rectifier, at least said first section being conductively connected to said input, a capacitor connected across said output on the output side of said rectifier, switch means comprising electronic valve means actuatable to on and off conditions respectively, said switch means being conductively connected to said first section of said inductance means in a manner independent of said second section of said inductance means, and switch actuating means for sensing the voltage at said output and actuating said switch means between said on and off conditions in a manner related to said sensed output voltage, in which said first and second sections of said inductance means are in non-conductive inductive relation with one another and said input and output are operatively connected substantially only by said inductive relation between said inductance means sections and in which said switch actuating means comprises a flip-flop circuit, an output voltage sensing circuit, means operatively connecting said flip-flop circuit to said output voltage sensing circuit so that the timing of the flip-flop action of said flip-flop circuit is controlled by said sensing circuit, and an operative connection between said flip-flop circuit and said switch means, whereby the condition of said switch means is controlled by the status of said flip-flop circuit.

4. A DC voltage magnitude modifying arrangement comprising a DC input, a DC output, and a circuit operatively connecting said input and output, said circuit comprising inductance means and a rectifier operatively connected between said input and output, said inductance means comprising first and second inductively related sections, at least said second section being conductively connected to said output via said rectifier, at least said first section being conductively connected to said input, a capacitor connected across said output on the output side of said rectifier, switch means comprising electronic valve means actuatable to on and off conditions respectively, said switch means being conductively connected to said first section of said inductance means in a manner independent of said second section of said inductance means, and switch actuating means for sensing the voltage at said output and actuating said switch means between said on and off conditions in a manner related to said sensed output voltage, in which said first and second sections of said inductance means are in non-conductive inductive relation with one another and said input and output are operatively connected substantially only by said inductive relation between said inductance means sections, and in which said switch actuating means comprises a flip-flop circuit, an output voltage sensing circuit, means operatively conecting said flip-flop circuit to said output voltage sensing circuit so that the timing of the flip-flop action of said flip-flop circuit is controlled by said sensing circuit, and an operative connection between said flip-flop circuit and said switch means, whereby the condition of said switch means is controlled by the status of said flip-flop circuit, and in which said voltage sensing circuit comprises a transistor having an output circuit and an input circuit, said input circuit being operatively connected to said output voltage, said output circuit being operatively connected to said flip-flop circuit.

5. A DC voltage magnitude modifying arrangement comprising a DC input, a DC output, and a circuit operatively connecting said input and output, said circuit comprising inductance means and a rectifier operatively connected between said input and output, said inductance means comprising first and second inductively related sections, at least said second section being conductively connected to said output via said rectifier, at least said first section being conductively connected to said input, a capacitor connected across said output on the output side of said rectifier, switch means comprising electronic value means actuatable to on and off conditions respectively, said switch means being conductively connected to said first section of said inductance means in a manner independent of said second section of said inductance means, and switch actuating means for sensing the voltage at said output and actuating said switch means between said on and off conditions in a manner related to said sensed output voltage, in which said first and second sections of said inductance means are in non-conductive inductive relation with one another and said input and output are operatively connected substantially only by said inductive relation between said inductance means sections, and in which said inductance means comprises a third section inductively and non-conductively related to said first and second sections, an additional output, said third section of said inductance means being conductively connected to said additional output, a capacitor connected across said additional output, and a rectifier operatively connected between said third section of said inductance means and said additional output.

6. A DC voltage magnitude modifying arangement comprising a DC input, a DC output, and a pair of lines electrically connecting said input and said output, an inductance and a rectifier connected in series in one of said lines, said inductance having an input end, a capacitor connected across said lines from a point on said one line between said rectifier and said output, switch means actuatable to on and off conditions respectively connected between the other of said lines and a point on said inductance spaced from the input end thereof, means for sensing said voltage output, a flip-flop circuit connected between said voltage sensing means and said switch means, means for controlling the timing of the action of said flip-flop means in shifting from one status to the other in accordance with the sensed output voltage, and means for controlling the on-off condition of said switch means in accordance with the status of said flip-flop means.

7. The DC voltage magnitude modifying arrangement of claim 6, in which said voltage sensing circuit comprises a transistor having an output circuit and an input circuit, said input circuit being operatively connected to said output voltage, said output circuit being operatively connected to said flip-flop circuit.

8. The DC voltage magnitude modifying arrangement of claim 6, in which said switch means and said flip-flop circuit are transistorized.

9. The DC voltage magnitude modifying arrangement of claim 8, in which said means for sensing said voltage output comprises a transistor having an output circuit and an input circuit, said input circuit being operatively connected to said DC output, said output circuit being operatively connected to said flip-flop circuit.

10. In the DC voltage magnitude modifying arrangement of claim 6, said switch means comprising a transistor, a resistor in said one of said lines between said inductance and the corresponding input point, said flip-flop circuit comprising a pair of transistors connected in flip-flop manner across said lines from a point on said one line between said inductance and said resistor, said switch-controlling means comprising a transistor operatively connected between said flip-flop transistors and said switch means transistor for controlling the on-off condition of the latter in accordance with the flip-flop status of the former.

References Cited

UNITED STATES PATENTS

| | | | |
|---|---|---|---|
| 3,331,008 | 7/1967 | Bedford | 321—2 |
| 3,113,275 | 12/1963 | Minter | 321—2 X |
| 3,263,099 | 7/1966 | Bedford | 307—109 |
| 3,300,705 | 8/1963 | Hunstad | 321—2 |

FOREIGN PATENTS 1,053,591   5/1959   Germany.

OTHER REFERENCES

Bedford/Hoft, Principles of Inverter Circuits, John Wiley & Sons, Inc., 1964, p. 339.

JOHN F. COUCH, *Primary Examiner.*

WARREN E. RAY, *Examiner.*

W. H. BEHA, *Assistant Examiner.*